United States Patent
Chen et al.

(10) Patent No.: US 10,236,138 B2
(45) Date of Patent: Mar. 19, 2019

(54) KEY STRUCTURE

(71) Applicant: LITE-ON TECHNOLOGY CORPORATION, Taipei (TW)

(72) Inventors: Chun-Lin Chen, Taipei (TW); Hsin-Fu Liu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 65 days.

(21) Appl. No.: 15/618,602

(22) Filed: Jun. 9, 2017

(65) Prior Publication Data

US 2017/0278650 A1 Sep. 28, 2017

Related U.S. Application Data

(63) Continuation-in-part of application No. 15/049,001, filed on Feb. 19, 2016, now Pat. No. 9,748,058.

(30) Foreign Application Priority Data

Oct. 15, 2015 (TW) .............................. 104133859 A (51) Int. Cl.
*H01H 13/14* (2006.01)
*H01F 1/059* (2006.01)
(Continued)

(52) U.S. Cl.
CPC ........... *H01H 13/14* (2013.01); *G06F 1/1616* (2013.01); *G06F 1/1662* (2013.01);
(Continued)

(58) Field of Classification Search
CPC ..... H01H 13/84; H01H 13/705; G06F 1/1616
(Continued)

(56) References Cited

U.S. PATENT DOCUMENTS 4,977,298 A 12/1990 Fujiyama
5,382,762 A 1/1995 Mochizuki
(Continued)

FOREIGN PATENT DOCUMENTS

| CN | 1145687 A | 3/1997 |
|---|---|---|
| TW | 201434064 A | 9/2014 |
| TW | 201515040 A | 4/2015 |

OTHER PUBLICATIONS

U.S. Office Action dated Jun. 16, 2017 corresponding to U.S. Appl. No. 15/232,272.
Taiwanese Office Action dated May 4, 2017.

*Primary Examiner* — Renee S Luebke
*Assistant Examiner* — Iman Malakooti
(74) *Attorney, Agent, or Firm* — Rabin & Berdo, P.C.

(57) ABSTRACT

A key structure includes a key cap, a bridge assembly, a first supporting part, a second supporting part, an attractable element and a magnet. The bridge assembly includes first and second hinge parts. The first hinge part has a first pivot coupling portion and a first connecting portion. The second hinge part has a second pivot coupling portion and a second connecting portion, wherein the first and second connecting portions are connected on an axis, and the first and second hinge parts rotate with respect to the axis. The first and second supporting parts are coupled to two ends of the first and second pivot coupling portions, respectively. The attractable element is disposed on the second hinge part. The magnet is correspondingly located under the attractable element for providing a magnetic force, so that the attractable element is attracted and positioned by the magnetic force.

15 Claims, 12 Drawing Sheets

Related U.S. Application Data (60) Provisional application No. 62/158,526, filed on May 7, 2015.

(51) Int. Cl.
- *G06F 1/16* (2006.01)
- *H01H 13/70* (2006.01)
- *H01H 3/12* (2006.01)
- *H01H 13/7065* (2006.01)

(52) U.S. Cl.
CPC ........... *G06F 1/1681* (2013.01); *H01F 1/059* (2013.01); *H01H 3/122* (2013.01); *H01H 3/125* (2013.01); *H01H 13/70* (2013.01); *H01H 13/7065* (2013.01); *H01H 2221/04* (2013.01); *H01H 2227/036* (2013.01)

(58) Field of Classification Search
USPC .................................................. 200/5 A, 341
See application file for complete search history.

(56) References Cited

U.S. PATENT DOCUMENTS

| | | | |
|---|---|---|---|
| 5,977,888 A * | 11/1999 | Fujita | H01H 13/705 |
| | | | 200/12 |
| 6,172,868 B1 | 1/2001 | Oura | |
| 7,022,927 B2 | 4/2006 | Hsu | |
| 7,417,200 B2 | 8/2008 | Hsu | |
| 7,449,651 B2 * | 11/2008 | Lin | H01H 3/125 |
| | | | 200/344 |
| 9,748,058 B2 * | 8/2017 | Chen | H01H 13/84 |
| 2009/0283393 A1 * | 11/2009 | Chen | G06F 3/0202 |
| | | | 200/314 |
| 2014/0231234 A1 * | 8/2014 | Hsu | H01H 13/52 |
| | | | 200/5 A |
| 2015/0101916 A1 * | 4/2015 | Chen | H01H 3/125 |
| | | | 200/5 A |
| 2015/0101917 A1 * | 4/2015 | Yen | H01H 13/84 |
| | | | 200/5 A |

\* cited by examiner

KEY STRUCTURE

This application is a continuation-in-part application of co-pending U.S. application Ser. No. 15/049,001, filed on Feb. 19, 2016, which claims the benefit of U.S. provisional application Ser. No. 62/158,526, filed on May 7, 2015, and the benefit of Taiwan application Serial No. 104133859, filed Oct. 15, 2015. These related applications are incorporated herein by references.

BACKGROUND OF THE INVENTION

Field of the Invention

The invention relates in general to a key structure, and more particularly to a key structure with lightweight and thinning design.

Description of the Related Art

In a conventional key structure, an elastic member provides a recovery elastic force for a key cap supported by a scissor structure to restore the key cap to its pre-pressing position. However, the scissor structure, being hard to assemble and having a longer pressing stroke, is not suitable to the keyboard with thinning design. Meanwhile, when the key cap is pressed, the downward force is transmitted to a thin film circuit board formed of bi-layer circuits by the elastic member. However, if the downward force is insufficient, it is difficult to make the bi-layer circuits come into contact, and the sensitivity will be poor. Besides, the key structure cannot be stored to reduce the structural height when the key structure is not in use. Under the current trend of ultra-thinning design of the portable computer, there is a strong need to develop a new key structure whose overall height is reduced when the portable computer is closed.

SUMMARY OF THE INVENTION

The invention is directed to a key structure with lightweight and thinning design, capable of shortening the pressing stroke and increasing the sensitivity.

According to one embodiment of the present invention, a key structure including a key cap, a bridge assembly, a first supporting part, a second supporting part, an attractable element and a magnet is provided. The bridge assembly is disposed under the key cap. The bridge assembly includes a first hinge part and a second hinge part. The first hinge part has a first pivot coupling portion and a first connecting portion. The second hinge part has a second pivot coupling portion and a second connecting portion, wherein the first connecting portion and the second connecting portion are connected to form an axis, and the first hinge part and the second hinge part rotate with respect to the axis, and the axis is located between the first pivot coupling portion and the second pivot coupling portion. The first and second supporting parts are coupled to two ends of the first pivot coupling portion and two ends of the second pivot coupling portion, respectively. The attractable element is disposed on the second hinge part. The magnet is correspondingly located under the attractable element for providing a magnetic force, so that the attractable element is attracted and positioned by the magnetic force.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 3-1 is a schematic diagram of a base board with a magnet.

FIG. 3-2 is a schematic diagram of a receiving slot for receiving a magnet.

FIG. 7B-1 is an enlarged portion of the magnet at a key structure of FIG. 7B.

FIG. 7C-1 is an enlarged portion of the magnet at a key structure of FIG. 7C.

DETAILED DESCRIPTION OF THE INVENTION

A number of embodiments are disclosed below for elaborating the invention. However, the embodiments of the invention are for detailed descriptions only, not for limiting the scope of protection of the invention.

Figure 1:
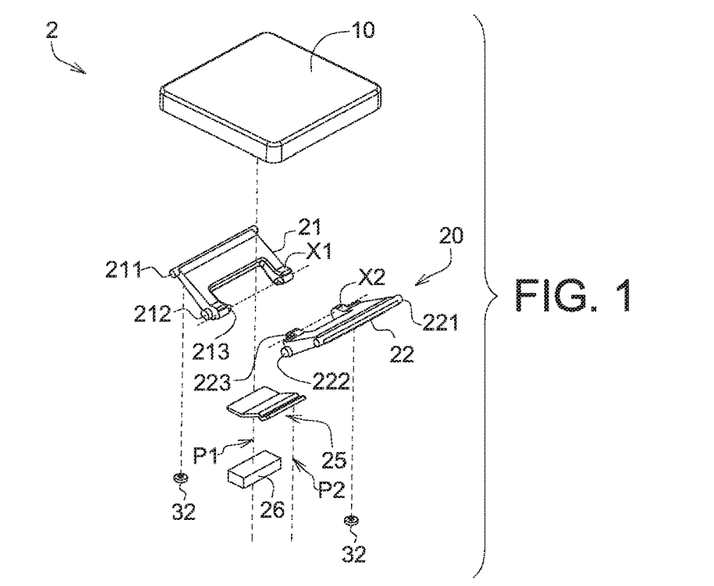
FIGS. 1-2 are a top-view decomposition diagram and a bottom-view decomposition diagram of a key structure according to an embodiment of the invention respectively.
Figure 2:
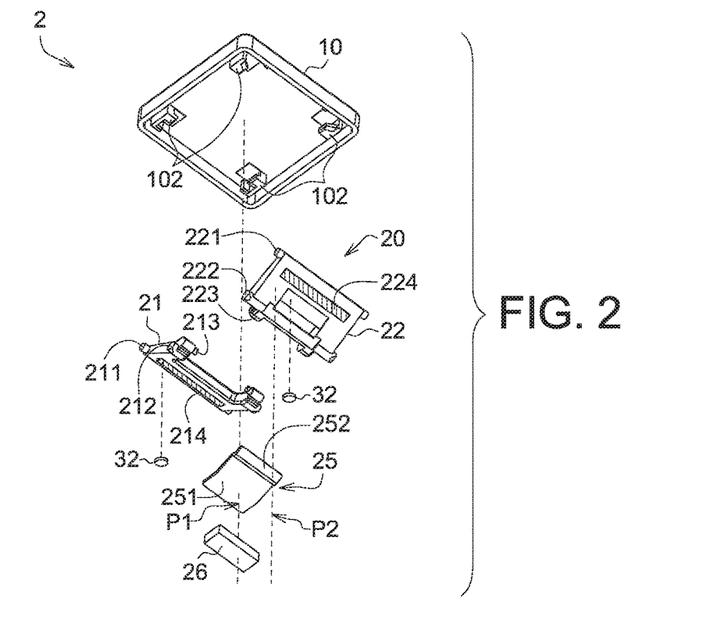

FIGS. 1-2 respectively are a top-view decomposition diagram and a bottom-view decomposition diagram of a key structure 2 according to an embodiment of the invention. Refer to FIG. 1. The key structure 2 includes a key cap 10 and a bridge assembly 20. The bridge assembly 20 is disposed under the key cap 10. The bridge assembly 20 includes a first hinge part 21 and a second hinge part 22 intersecting to form a V-shaped structure. One end end of the first hinge part 21 has a first link bar 211, and the other end of the first hinge part 21 has a first pivot coupling portion 212 and a first shaft X1. One end of the second hinge part 22 has a second link bar 221, and the other end of the second hinge part 22 has a second pivot coupling portion 222 and a a second shaft X2. Additionally, the first shaft X1 of the first hinge part 21 has a first connecting portion 213, and the second shaft X2 of the second hinge part 22 has a second connecting portion 223. The first connecting portion 213 and the second connecting portion 223 are coupled to each other through such as a protrusion portion and an indention portion to form an axis A1 (refer to FIG. 4, FIG. 6A and FIG. 6B), so that the first shaft X1 of the first hinge part 21 and the second shaft X2 of the second hinge part 22 are on the same axis.

As indicated in FIG. 1, the key structure 2 further includes an attractable element 25 and a magnet 26. The attractable element 25 is disposed under the bridge assembly. In an embodiment, the attractable element 25 can be fixed under the bridge assembly through an engaging structure. In another embodiment, the bridge assembly 20 is made by using an in-mold injection method. First, the attractable element 25 is disposed inside a mold, and then plastics is heated and injected into the mold to form the first hinge part 21 and the second hinge part 22 of the bridge assembly 20, so that the first hinge part 21 or the second hinge part 22 formed by way of injection can be integrally formed in one piece with the attractable element 25 disposed inside the mold. The attractable element 25 and the magnet 26 can be deemed as a magnetic assembly. The magnet 26 is preferably made of permanent magnetic materials, which includes hard ferrites magnet and rare-earth Nd—Fe—B Magnet. Hard ferrites magnet is made of Sro, or Bao and Fe2O3 by ceramic manufacturing technology. Rare-earth Nd—Fe—B Magnet is mainly made of neodymium (Nd), iron (Fe), and boron (B) by method of metal melting and powder metallurgy, to be sintered with Al—Ni—Co, samarium (Sm)—Ni—Co, Sm—Co.

Figure 6A:
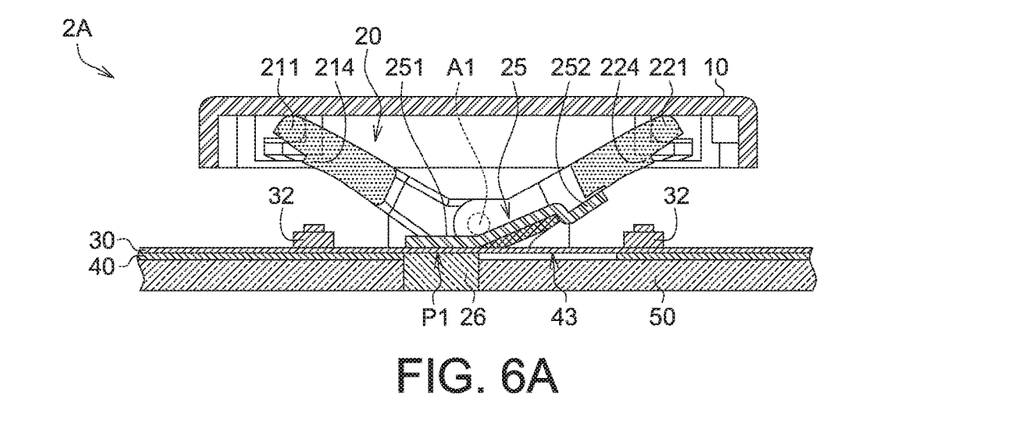
FIGS. 6A and 6B are cross-sectional views of a key structure along an A-A cross-sectional line of FIG. 5A when the key structure is pressed to change to a pressing status from a releasing status.

Refer to FIG. 2. In an embodiment, the attractable element 25 has a first end 251 and a second end 252. The first end 251 corresponds to a first attractive position P1, and the second end 252 corresponds to a second attractive position P2. Additionally, the magnet 26 provides a magnetic force and is movable between the underneath of the first attractive position P1 and the second attractive position P2. When the first end 251 of the attractable element 25 is attracted by the magnetic force and generates a reaction force to the bridge assembly 20, the first end 251 of the attractable element 25 is moved to the first attractive position P1 with respect to the axis A1 (refer to FIG. FIG. 4, FIG. 6A and FIG. 6B), so that the first hinge part 21 and the second hinge part 22 can be activated through the reaction force (that is a releasing status as indicated in FIG. 6A). Besides, when the second end 252 of the attractable element 25 is attracted by a magnetic force and generates a reaction force to the bridge assembly 20, the second end 252 of the attractable element 25 is moved to the second attractive position P2 with respect to the axis A1, so that the first hinge part 21 and the second hinge part part 22 can be activated through the reaction force. Therefore, by changing the the attraction between the magnet 26 and the first end 251 or the attraction between the magnet 26 and the second end 252 of the attractable element 25 to move the first hinge part 21 and the second hinge part 22, the bridge assembly 20 of the present embodiment can be switched between the releasing status and the storing status. In another embodiment, the magnet 26 26 can be fixed on a position under the first end 251 of the attractable element 25, so that the first hinge part 21 and the second hinge part 22 of the bridge assembly 20 can be switched between the releasing status and the pressing status.

In an embodiment, the attractable element 25 can be formed of a ferromagnetic material, and the magnet 26 can be formed of a permanent magnet or an electromagnet.

Refer to FIG. 2. In an embodiment, the key cap 10 includes a plurality of link bar supporting portions 102 on the bottom of key cap 10 for fixing or slidably supporting the first link bar 211 of the first hinge part 21 and the second link bar 221 of the second hinge part 22. In an embodiment, a first actuation portion 214 is protruded and disposed at the part in the outer side of the first hinge part 21 near the first link bar 211. The first actuation portion 214 is correspondingly located above a touch portion 32, such that when the key cap 10 is pressed, the first actuation portion 214 can touch the touch portion 32 to generate a key pressing signal. In another embodiment, a second actuation portion 224 is protruded and disposed at the part in the outer side of the second hinge part 22 near the second link bar 221. The second actuation portion 224 is correspondingly located above another touch portion 32, such that when the key cap 10 is pressed, the second actuation portion 224 can contact the other touch portion 32 to generate a key pressing signal. In other words, the key structure 2 of the invention has at least one actuation portion contacting at least one touch portion 32 to generate a key pressing signal.

Figure 3:
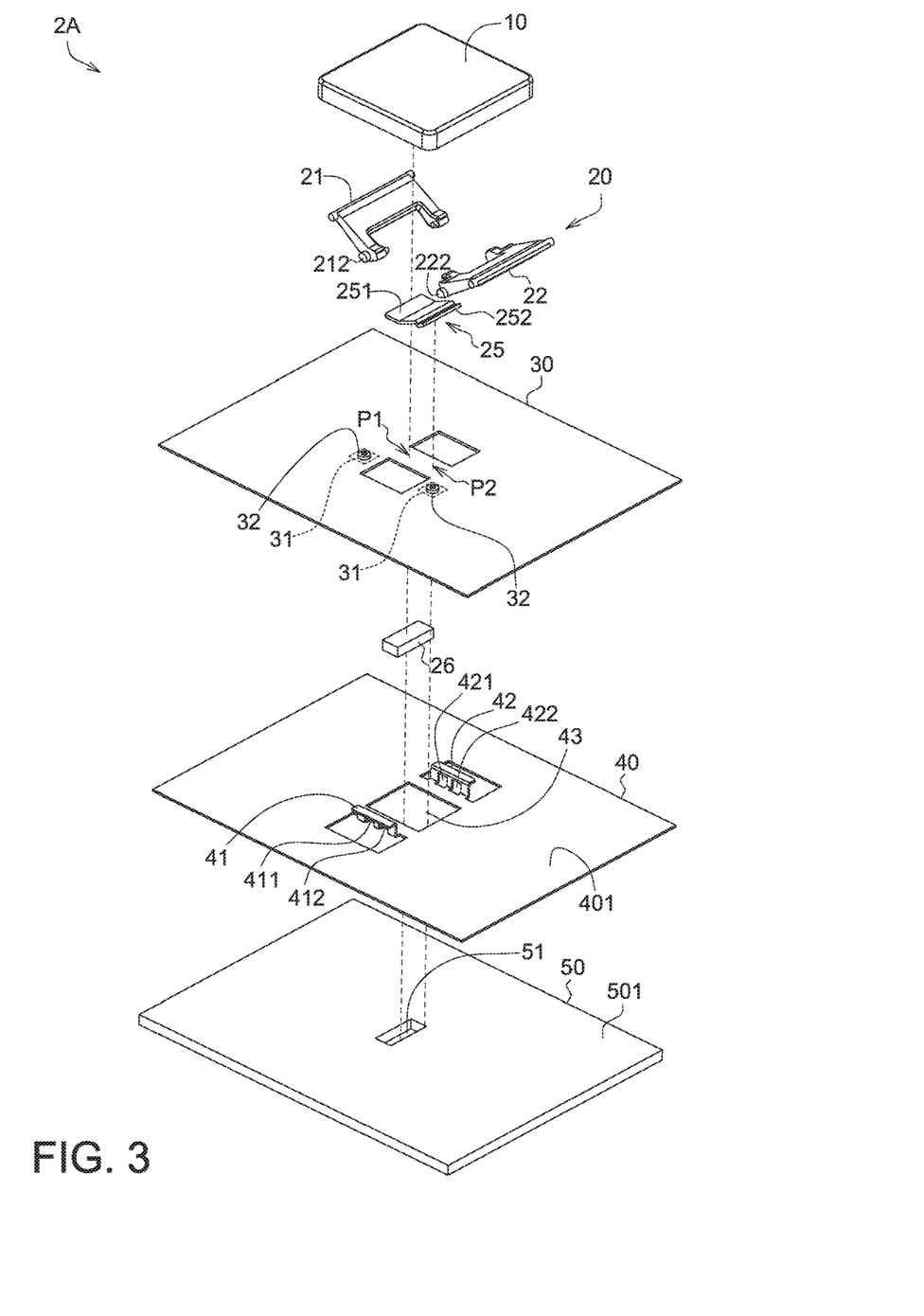
FIG. 3 is a decomposition diagram of a key structure before assembly according to an embodiment of the invention.

Refer to FIG. 3, a decomposition diagram of a key structure 2A before assembly according to an embodiment of the invention is shown. In an embodiment, the key structure 2A further includes a thin film circuit board 30, a supporting board 40 and a base board 50. The thin film circuit board 30 can be disposed on the supporting board 40 or integrally formed in one piece with the supporting board 40. In an embodiment, the supporting board 40 is disposed on the base board 50 and can slide with respect to the base board 50.

Refer to FIG. 3. In an embodiment, the touch portion 32 is disposed on the film circuit board 30 and corresponds to a position of a switch element 31 of the thin film circuit board 30. When the touch portion 32 is pressed, the switch element 31 disposed under the touch portion 32 is activated to generate a key pressing signal. The key pressing signal can be transmitted to a position processor (not illustrated) via the circuit of the film circuit board 30. Then, the position processor calculates the coordinate position of the key and generates a key pressing instruction corresponding to the key. In another embodiment, as shown in FIG. 10B the first actuation portion 214' and the second actuation portion 224' may press two switch elements 31 of the thin film circuit board 30 directly to generate a pressing signal.

In an embodiment, the touch portion 32 can be formed of an elastic material such as rubber, epoxy resin, semi-cured colloid or plastics in the shape of a dome.

In an embodiment, the switch element 31 includes an upper conductive layer and a lower conductive layer (not illustrated), which are separated by a gap. When the touch portion 32 is pressed, the upper conductive layer and the lower conductive layer contact each other to generate a key pressing signal.

Refer to FIG. 3. The supporting board 40 includes a first supporting part 41 and a second supporting part 42 which are opposite to each other and erected on the supporting side 401. The first supporting part 41 includes two first pivot holes 411 and 412, and the second supporting part 42 includes two second pivot holes 421 and 422. The first pivot holes 411 and 412 and the second pivot holes 421 and 422 are disposed oppositely for receiving two ends of the first pivot coupling portion 212 and two ends of the second pivot coupling portion 222, respectively. In an embodiment, the two ends of the first pivot coupling portion 212 of the first hinge part 21 can be located at the first pivot hole 411 and the second pivot hole 421, respectively; the two ends of the second pivot coupling portion 222 of the second hinge part 22 can be located at the other first pivot hole 412 and the other second pivot hole 422, respectively. Thus, the key cap 10 can be assembled onto the supporting board 40 through the bridge assembly 20 and can move upward/downward with respect to the supporting board 40. The movement of the first pivot coupling portion 212 and the second pivot coupling portion 222 can be obtained with reference to the descriptions of FIGS. 8A and 8B.

Referring to FIG. 3, the base board 50 can be a metal board or a reinforced plastic substrate. The base board 50 is disposed under the supporting board 40 to reinforce the rigid structure of the supporting board 40. In other words, the base board 50 can be used as a base of the keyboard, and and there is no need to additionally dispose a board on the base of the keyboard, hence reducing the weight and cost of the keyboard. In another embodiment, when the supporting board 40 has sufficient rigidity, the supporting board 40 can also be used as a base of the keyboard and there is no need to additionally dispose the base board 50 under the supporting board 40.

Refer to FIG. 3. In an embodiment, the supporting board 40 has a first opening 43, and the base board 50 has a second opening 51. The first opening 43 and the second opening 51 are basically located under the attractable element 25 and are capable of receiving the magnet 26. The second opening 51 can fix the magnet 26 on the base board 50. The size of the first opening 43 is, for example, equal to or larger than that of the second opening 51.

Figure 31:
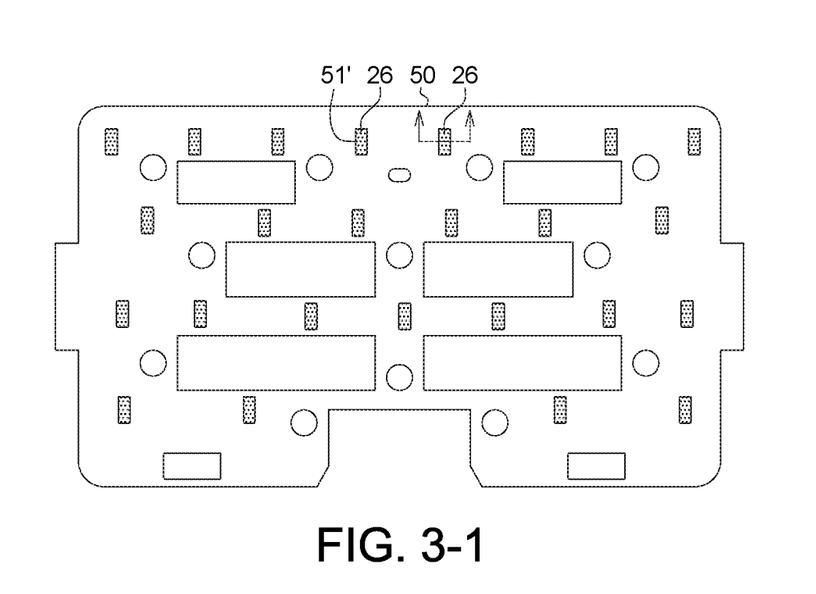
Figure 32:
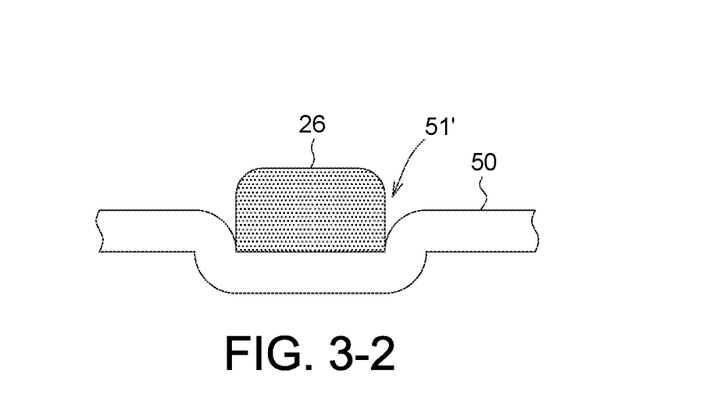

Refer to FIG. 3-1. In an embodiment, the base board 50 has a recess 51' for receiving the magnet 26 of each key structure on the base board 50. The recess 51' does not pass through the base board 50 and has an opening facing upward. Refer to FIG. 3-2, when the magnet 26 is disposed in the recess 51', the bottom of the magnet 26 is in contact with the base board 50 and is encompassed by sidewalls of the recess 51'. Therefore, a magnetic field of the magnet 26 forms a closed loop to enhance the intensity of the magnetic force.

Figure 4:
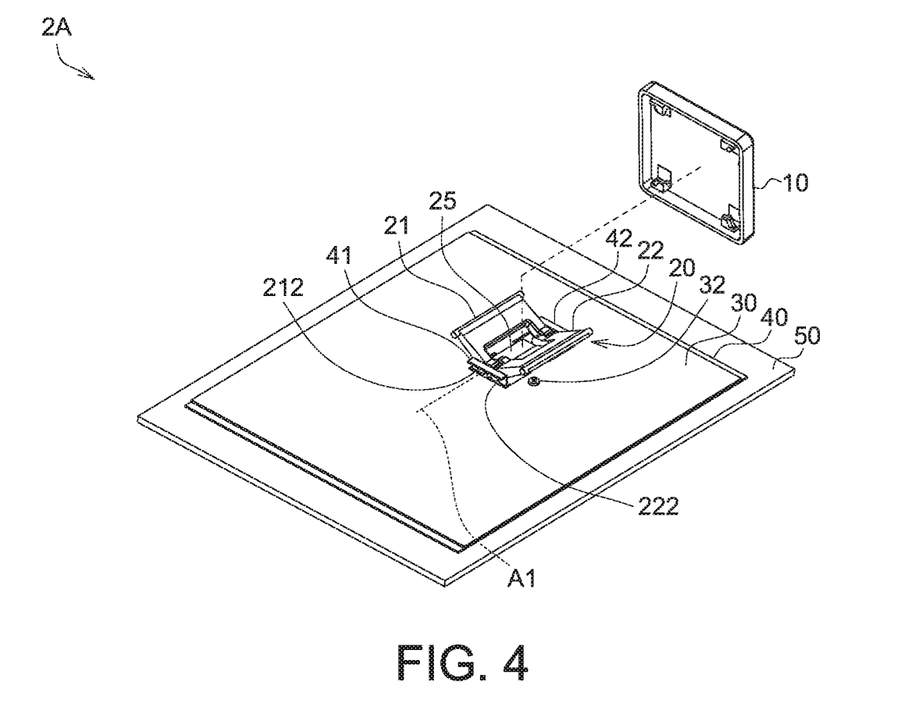
FIG. 4 is a schematic diagram of a key structure after assembly according to an embodiment of the invention.

FIG. 4 is a schematic diagram of a key structure 2A after assembly according to an embodiment of the invention. Refer to FIG. 4. In an embodiment, the first hinge part 21 and the second hinge part 22 are assembled onto the supporting board 40 through the first supporting part 41 and the second supporting part 42, respectively. After assembly, the first hinge hinge part 21 and the second hinge part 22 are connected as one piece and the rotation center is located on the axis A1. Refer to FIGS. 1 and 4. Since the first shaft X1 and the first pivot coupling portion 212 are not coaxial and the second shaft X2 and the second pivot coupling portion 222 are not coaxial either, the first pivot coupling portion 212, the second pivot coupling portion 222 and the axis A1 used as the rotation center form three non-coaxial hinge points (such as in the shape of W). Therefore, after assembly, the first hinge part 21 and the second hinge part 22 basically form a W-shaped structure.

Figure 5A:
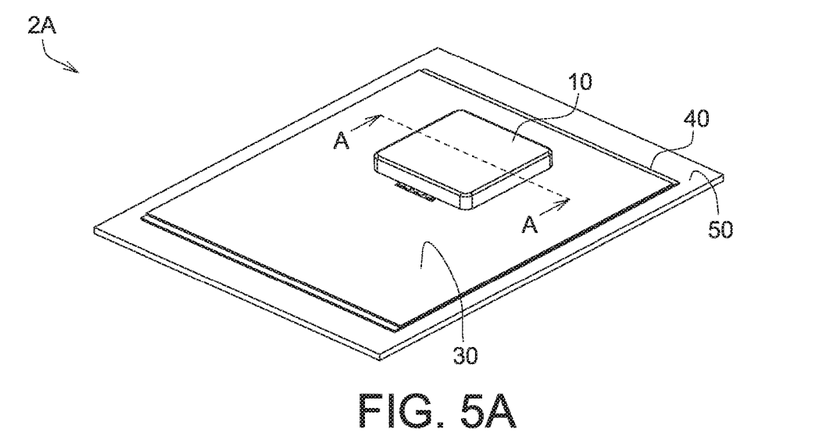
FIGS. 5A and 5B are appearance diagrams of the key structure of FIG. 4 in a releasing status and a storing status respectively.
Figure 6B:
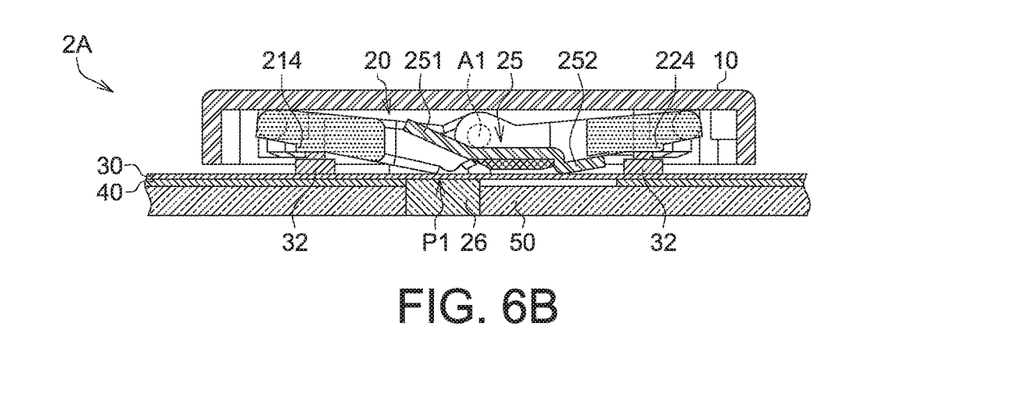

FIG. 5A is an appearance diagram of the key structure 2A of FIG. 4 in a releasing status. FIGS. 6A and 6B are cross-sectional views of a key structure 2A along an A-A cross-sectional line of FIG. 5A changed to a pressing status from a releasing status. Refer to FIG. 6A. In an embodiment, when the key cap 10 is not pressed, the first end 251 of the attractable element 25 is attracted by the magnet 26 and fixed at the first attractive position P1, so that the key cap 10 and the bridge assembly 20 enter a releasing status. Refer to FIG. 6B. When the key cap 10 is pressed, the first end 251 of the attractable element 25 is driven to move away from the magnet 26, so that the key cap 10 is moved to a pressing position from a releasing position. Then, when the key cap 10 is released, the first end 251 of the attractable element 25 is again attracted by the magnet 26, so that the key cap 10 and the bridge assembly 20 are driven to the releasing position by the magnetic force. Therefore, when the user presses or releases the key structure 2A, the key structure 2A is moved upward and downward between a pressing position and a releasing position by the magnetic force.

Figure 5B:
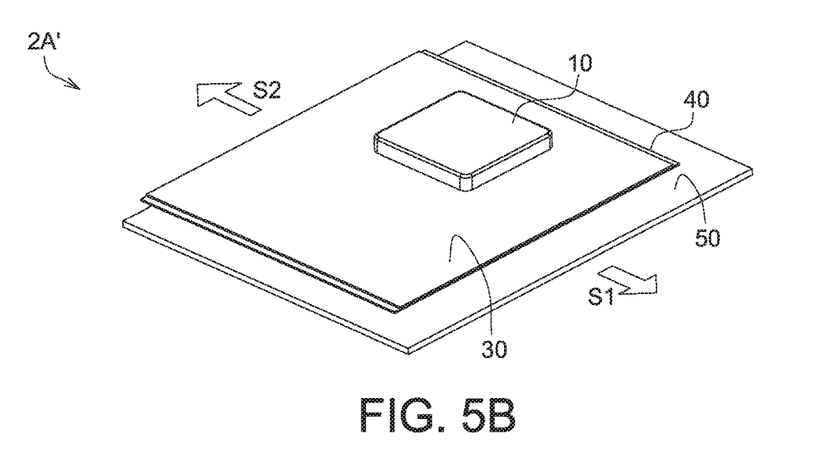

Refer to FIG. 5B. In an embodiment, the base board 50, such as a sliding board, slides with respect to the supporting board 40 along a first sliding direction 51, so that the key structure 2A' enters a storing status. Alternatively, the supporting board 40, such as a sliding board, slides with respect to the base board 50 along a second sliding direction S2, so that the key structure 2A' enters a storing status. When the key cap 10 is moved to the storing position, the receiving space that the key structure 2A' requires will be relatively reduced, and the overall height of the key structure 2A' will be reduced accordingly. Such condition makes the key structure having a lower height, so that it is benefited the storage of keyboard. For example, a keyboard of laptop computer with a lower height, and the screen can be folded folded upon the keyboard. Laptop computer can become slimmer than a conventional laptop computer.

In an embodiment, the first end 251 of the attractable element 25 can have a face contact or a line contact with the magnet 26. When the touch area is greater, the magnetic force would become greater, and the attractable element 25 would move downward and impact fast on the magnet to generate beating noise. Further, if the touch area between the attractable element 25 and the magnet 26 is changed, the variant of the magnetic force would be occurred to make the magnetic force unstable.

Figure 7A:
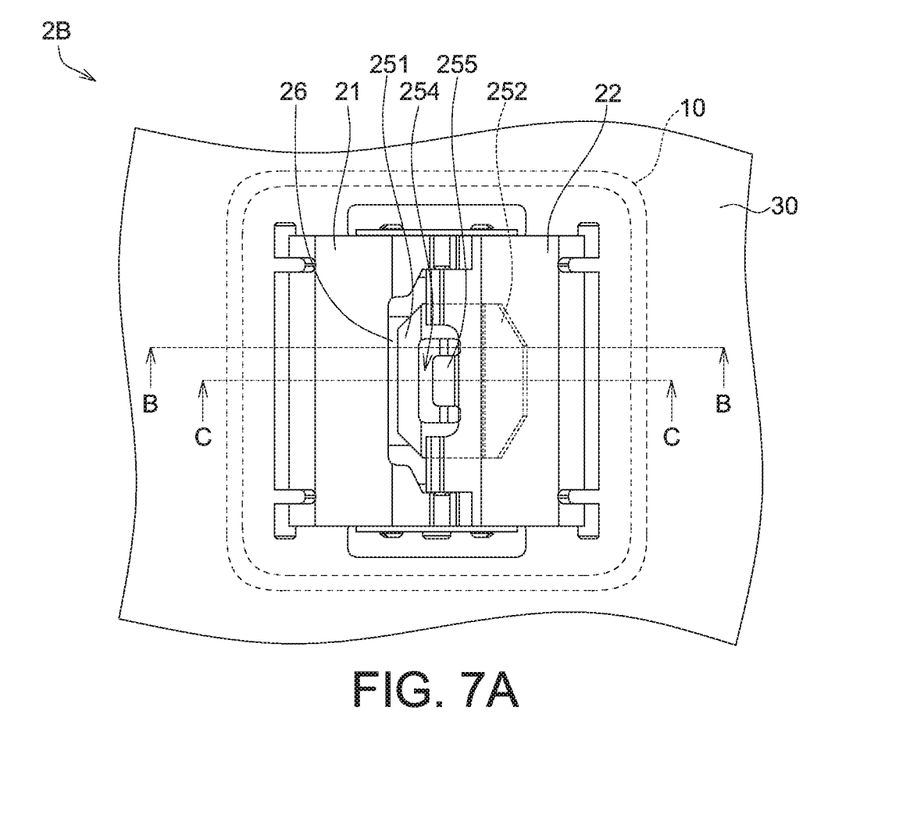
FIG. 7A is a top-view diagram of a key structure according to another embodiment of the invention.
Figure 7B:
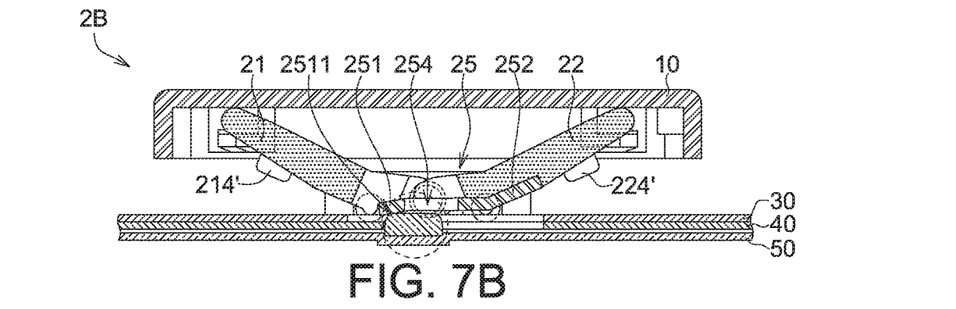
FIG. 7B is a cross-sectional view of a key structure along a B-B sectional line of FIG. 7A.
Figure 7B:
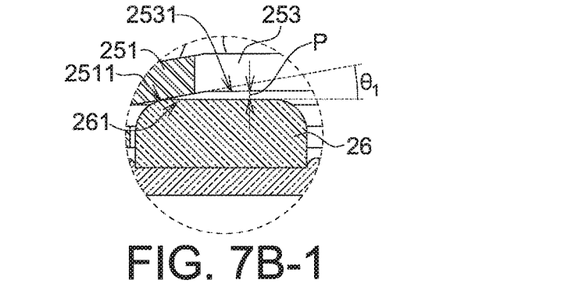

Referring to FIG. 7A, FIG. 7B and FIG. 7B-1, FIG. 7A is a top-view diagram of a key structure 2B (the key cap 10 is indicated by a dotted line) according to another embodiment of the invention, and FIG. 7B is a cross-sectional view of a key structure 2B along a B-B sectional line of FIG. 7A and FIG. 7B-1 is an enlarged portion of the magnet 26 at a key structure of FIG. 7B. The magnet 26 has an upper surface 261, and the attractable element 25 has a middle portion 253 between the first end 251 and the second end 252. The middle portion 253 of the attractable element 25 has a lower surface 2531 facing the upper surface 261 in parallel and the lower surface 2531 separates a gap P from the upper surface 261, such as 0.5 mm. The first end 251 of the attractable element 25 has a lower surface 2511 facing the upper surface 261 and the lower surface 2511 contacts the upper surface 261 at an acute angle. The lower surface 2511 forms an obtuse angle with the lower surface 2531, and the obtuse angle is such as about 170-175 degrees. That is, the lower surface 2511 of the first end 251 forms an inclined angle with the upper surface 261, and the inclined angle $\theta_1$ is such as about 5-10 degrees. The attractable element 25 has a line contact with the magnet 26, so that the magnetic force is reduced to make the key structure 2B easy to be pressed. Meanwhile, line contact can make the variant of the magnetic force reduced and make the magnetic force stable, and the beating noise would be reduced. Further, in the FIG. 5B, when the base board 50 slides with respect to the supporting part 40, line contact also can reduce the pushing force or pulling force applied to the base board 50.

In addition, as shown in FIG. 7B, the attractable element 25 has an opening 254, and the opening 254 overlaps the upper surface 261 of the magnet 26 in a vertical projecting direction of the key cap 10. When the size of the opening increases, the overlapping area of the attractable element 25 and the upper surface 261 of the magnet 26 is reduced so as to reduce the magnetic force.

Figure 7C:
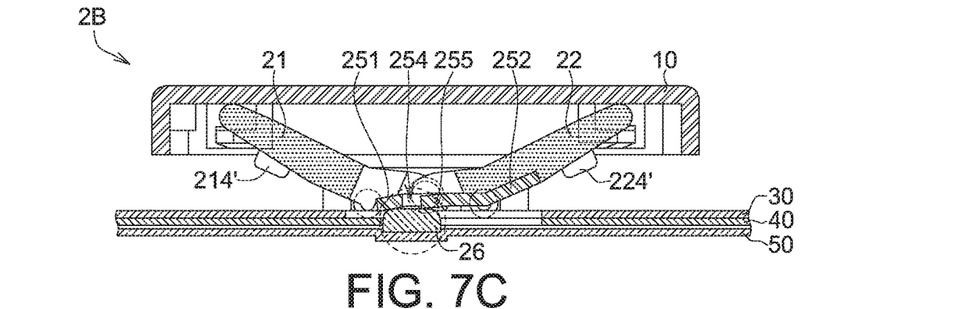
FIG. 7C is a cross-sectional view of a key structure along a C-C sectional line of FIG. 7A.
Figure 7C:
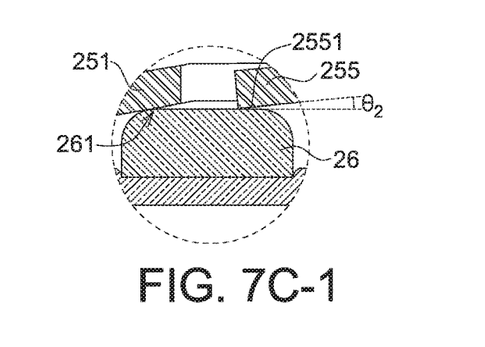

Moreover, referring to FIG. 7A, FIG. 7C and FIG. 7C-1, FIG. 7C is a cross-sectional view of a key structure 2B along a C-C sectional line of FIG. 7A and FIG. 7C-1 is an enlarged portion of the magnet 26 at a key structure of FIG. 7C. The attractable element 25 further includes a tongue plate 255 extending into the opening 254, and a lower surface 2551 of the tongue plate 255 extends towards the upper surface 261 and forms an inclined angle $\theta_2$ with the upper surface 261, and the inclined angle $\theta_2$ is such as about 5-10 degrees. That is, the tongue plate 255 is in line contact with the upper surface 261 of the magnet 26 so as to compensate the magnetic force reduced due to the opening 254. Meanwhile, the tongue plate 255 also can be attracted on the upper surface 261 of the magnet 26 to increase the positioning between the attractable element 25 and the magnet 26.

Figure 8A:
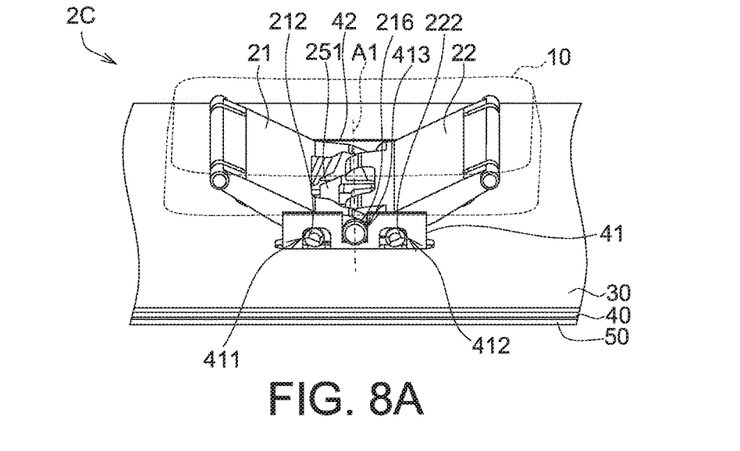
FIGS. 8A and 8B are schematic diagrams of a key structure according to another embodiment of the invention when the key structure is pressed to change to a pressing status from a releasing status.
Figure 8B:
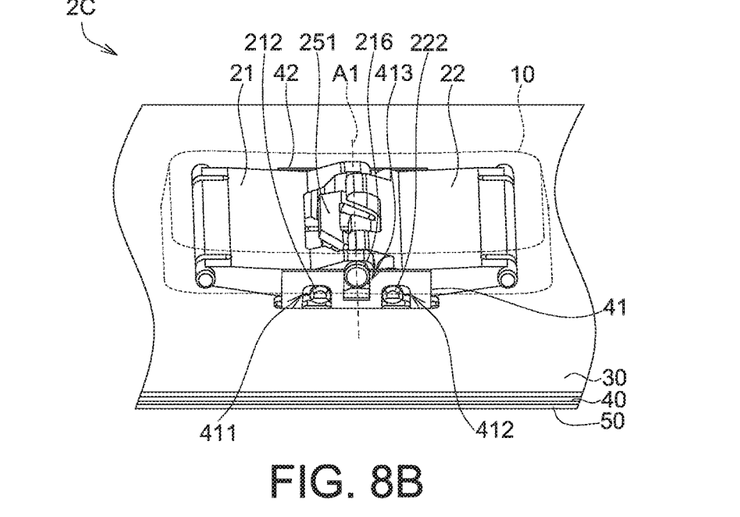

Referring to FIG. 8A and FIG. 8B, FIGS. 8A and 8B are schematic diagrams of a key structure 2C according to another embodiment of the invention when the key structure 2C is pressed to change to a pressing status from a releasing status. When the key cap 10 is pressed, the axis A1 as the rotation center is moved upward such that the first pivot coupling portion 212 and the second pivot coupling portion 222 are moved towards the insides of two first pivot holes 411 and 412 and contact the insides of the two first pivot holes 411 and 412. When the key cap 10 is released, the axis A1 as the rotation center is moved downward, such that the first pivot coupling portion 212 and the second pivot coupling portion 222 respectively move towards the outsides of two first pivot holes 411 and 412 of the first hinge part 41 and contact the outsides of the two first pivot holes 411 and 412. Therefore, the axis A1 can move upward or downward.

As illustrated in FIG. 8A and FIG. 8B, except from the two first pivot holes 411 and 412, the first supporting part 41 further includes a positioning hole 413. The positioning hole 413 is located between the two first pivot holes 411 and 412 and separated from the two first pivot holes 411 and 412. In addition, the first hinge part 21 has at least a positioning stick 216 on the axis A1 and received in the positioning hole 413. When the key cap 10 is pressed to move downwards, the positioning stick 216 has a degree of freedom with respect to the positioning hole 413 in a movement direction of the key cap 10 to limit the movement of the positioning stick 216. Therefore, the position of the attractable element 25 corresponding to the magnet 26 can be secured by the positioning hole 413 and the positioning column 216 of the present embodiment to make the magnetic force more stable. In an embodiment, the use of a single positioning stick 216 can make the opposite sides of the first hinge part 21 asymmetrically, so that the positions of the first hinge part 21 and the second hinge part 22 at corresponding first pivot holes 411 and 412 can be easily determined according to the positioning stick 216 to achieve the fool-proof effect. In another embodiment (not shown), the positioning stick also can be disposed on the second hinge part when the first hinge part and the second hinge part are exchanged.

Figure 8C:
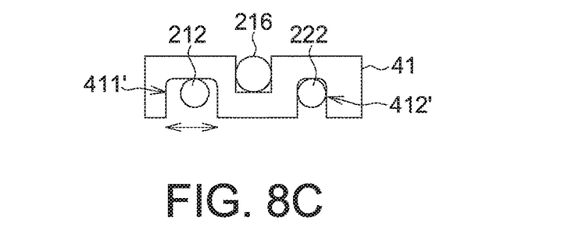
FIG. 8C is a schematic diagram of a pivot structure of a key structure according to another embodiment of the invention.

Further, referring to FIG. 8C, in an embodiment, the fits between the two ends of the second pivot coupling portion 222 and the corresponding first pivot hole 412' and second pivot hole (not illustrated in FIG. 8C) can adopt close clearance to reduce the tolerance and avoid the second pivot coupling portion 222 moving laterally, such that the position of the attractable element 25 corresponding to the magnet 26 can be secured to make the magnetic force more stable. On the other hand, the fits between the two ends of the first first pivot coupling portion 212 and the corresponding first pivot hole 411' and second pivot hole (not illustrated in FIG. 8C) can adopt loose clearance to increase the tolerance such that the first pivot coupling portion 212 can move laterally, however, since the attractable element 25 is not located on the first hinge part 21, the position of the attractable element 25 corresponding to the magnet 26 would not be shifted.

Figure 9A:
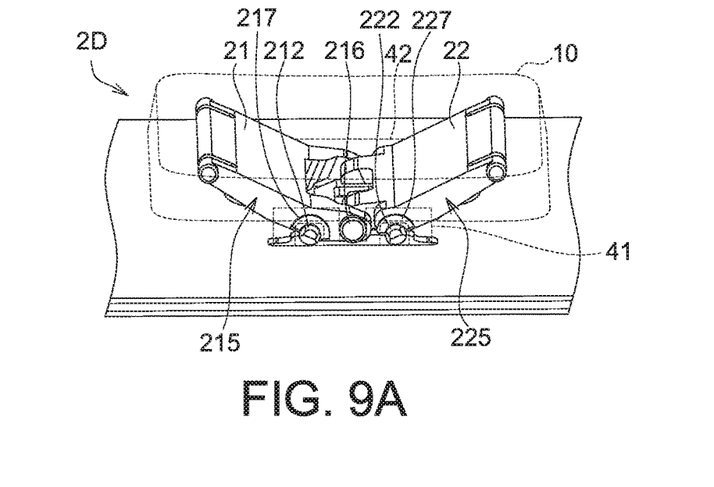
FIG. 9A is a schematic diagram of a key structure according to another embodiment of the invention.
Figure 9B:
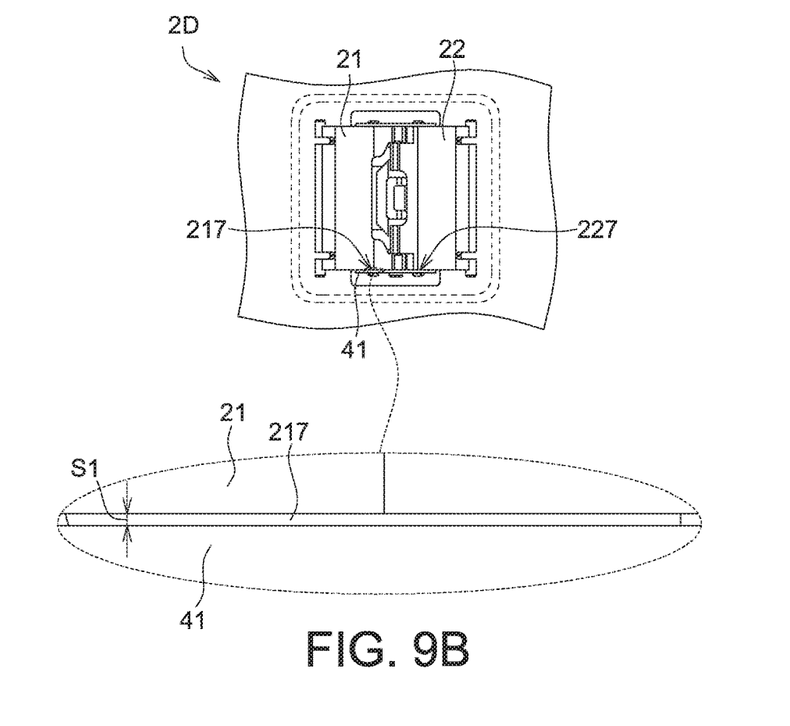
FIG. 9B is a top-view diagram of a key structure of FIG. 9A and an enlarged portion at the first pivot coupling portion.

Next, referring to FIG. 9A and FIG. 9B, FIG. 9A is a schematic diagram of a key structure 2D (the key cap 10 and the supporting parts 41, 42 are indicated by dotted lines) according to another embodiment of the invention, and FIG. 9B is a top-view diagram of a key structure 2D of FIG. 9A and an enlarged portion at the first gasket 217. The key structure 2D further includes two first gaskets 217 (only shown one) and two second gaskets 227 (only shown one). The first gaskets 217 are disposed on two ends of the first pivot coupling portion 212 respectively so that the first hinge part 21 and the first supporting part 41 as well as the first hinge part 21 and the second supporting part 42 are spaced apart at a first distance S1, respectively. In addition, the second gaskets 227 are disposed on two ends of the second pivot coupling portion 222 so that the second hinge part 22 and the first supporting part 41 as well as the second hinge part 22 and the second supporting part 42 are spaced apart at a second distance (not shown), respectively. The second distance is substantially equal to the first distance S1. Therefore, the friction force is reduced since the direct contacts between the two lateral sides 215 of the first pivot part 21 and the corresponding first supporting part 41 and second supporting part 42 are avoided. Thus, the first hinge part 21 is easy to rotate accordingly. On the other hand, the friction force is reduced since the direct contacts between the two lateral sides 225 of the second pivot part 22 and the corresponding first supporting part 41 and second supporting part 42 are avoided. Thus, the second hinge part 22 is easy to rotate accordingly.

Figure 10A:
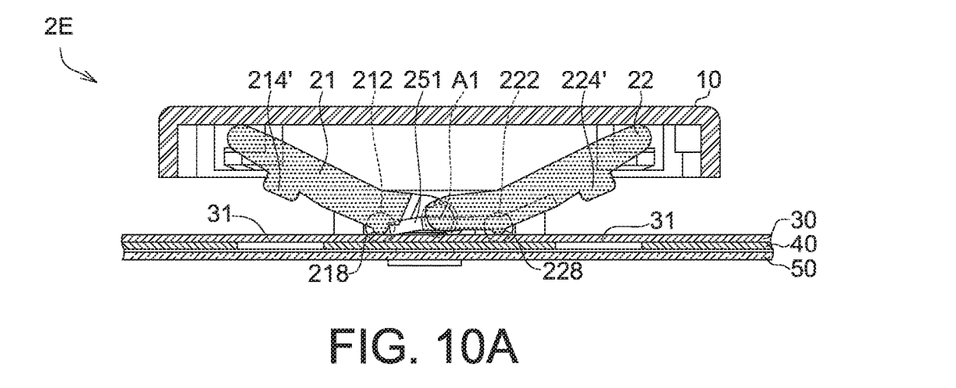
FIGS. 10A and 10B are schematic diagrams of a key structure according to another embodiment of the invention when the key structure is pressed to change to a pressing status from a releasing status.
Figure 10B:
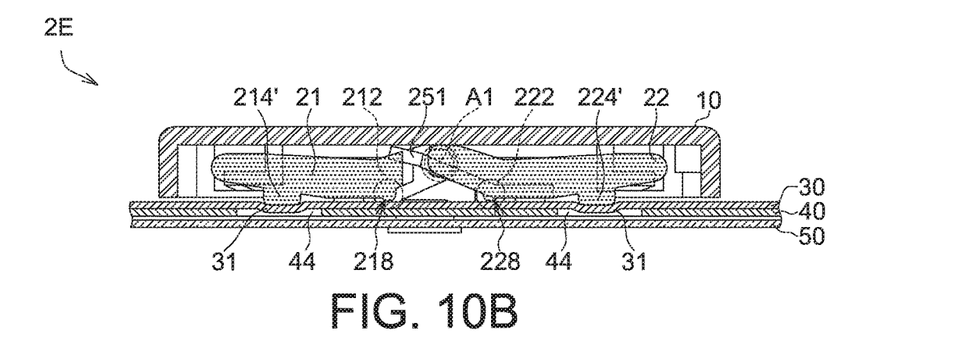

Referring to FIG. 10A and FIG. 10B, FIGS. 10A and 10B are schematic diagrams of a key structure 2E according to another embodiment of the invention when the key structure 2E is pressed to change to a pressing status from a releasing status. In an embodiment, a first protrusion 218 and a second protrusion 228 are disposed on positions where the first hinge part 21 and the second hinge part 22 contact with the thin film circuit board 30 respectively. The first protrusion 218 has a height (greater than 0) protruded from a bottom side of the first hinge part 21 and the second protrusion 228 has a height (greater than 0) protruded from a bottom side of the second hinge part 22. Therefore, when the first hinge part 21 and the second hinge part 22 rotate to each other, the first protrusion 218 interferes with the thin film circuit board 30 and the second protrusion 228 interferes with the thin film circuit board 30, so that the first protrusion 218 and the second protrusion 228 can be used to reduce a tolerance between the first hinge part 21 and thin film circuit board 30 and a tolerance between the second hinge part 22 and thin film circuit board 30, and thereby a noise generated by pressing the key structure 2E in the existence of the tolerance can be avoided.

Please refer to FIG. 10B. When the key cap 10 moves downwards, the first actuation portion 214' and the second actuation portion 224' may press two switch elements 31 of the thin film circuit board 30 directly to generate a pressing signal. When the two switch elements 31 are pressed, the two switch elements 31 can recess into two cavities 44 of the supporting board 40 respectively. The amount of the switch elements 31 is not limited to two, also can be more than two.

Figure 11A:
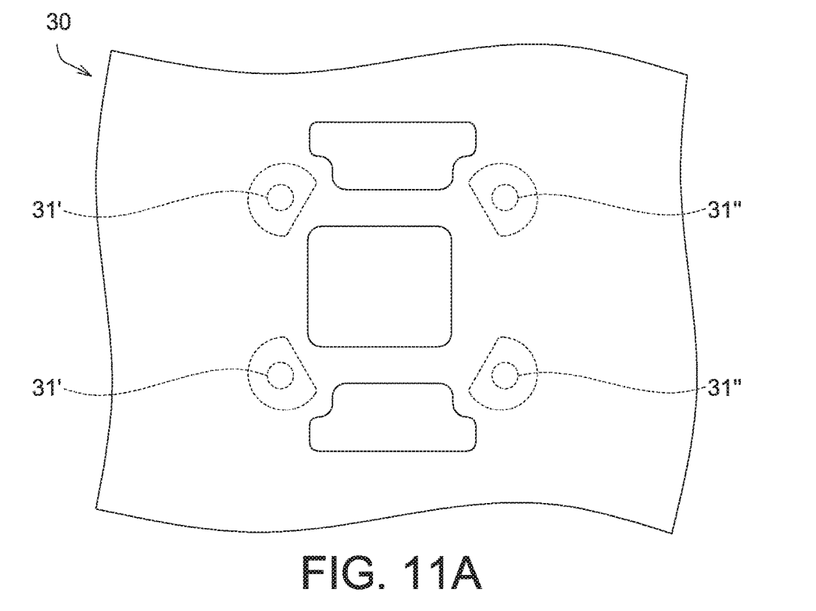
FIG. 11A is a top-view diagram of the thin film circuit board.
Figure 11B:
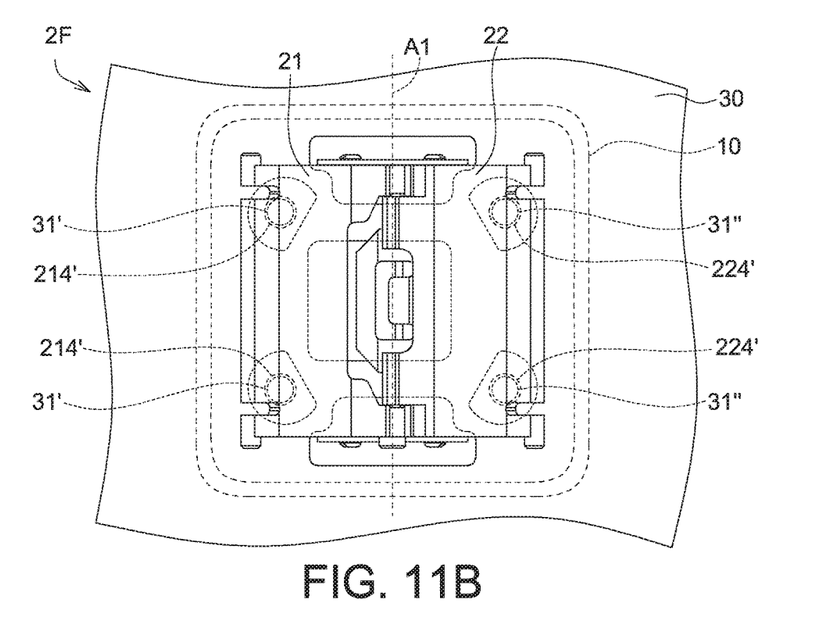
FIG. 11B is a top-view diagram of a first hinge part and a second hinge part disposed on the thin film circuit board.

Referring to FIGS. 10A-10B and FIG. 11A-11B, FIG. 11A is a top-view diagram of the thin film circuit board 30, and FIG. 11B is a top-view diagram of a key structure 2F with a first hinge part 21 and a second hinge part 22 disposed on the thin film circuit board 30. In an embodiment, the thin film circuit board 30 has two first switch elements 31' and two second switch elements 31" for each key cap 10, and the first hinge part 21 has two first actuation portions 214' correspondingly located above the two first switch elements 31', and the second hinge part 22 has two second actuation portions portions 224' correspondingly located above the two second switch elements 31". The first actuation portions 214' and the second actuation portions 224" are adjacent to two edges of the key cap 10 and on opposite sides with respect to the axis A1 passing through the center of the key cap 10. In other words, the positions where the first hinge part 21 and the second hinge part 22 22 contact with the thin film circuit board 30 are adjacent to the four corners of the key cap 10. Accordingly, no matter the middle or edges of the key cap 10 is pressed by the user, a corresponding signal can be easily triggered so as to increase the sensitivity of the key structure 2F. The first switch elements 31' and the second switch elements 31" may be conducted in series in the thin film circuit board 30 of the present embodiment, so that a pressing signal is generated when just one of the switch elements 31' and 31" is pressed.

While the invention has been described by way of example and in terms of the preferred embodiment(s), it is to the underneath of stood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A key structure, comprising:
   a key cap;
   a bridge assembly disposed under the key cap, wherein the bridge assembly comprises:
      a first hinge part, having a first pivot coupling portion and a first connecting portion; and
      a second hinge part, having a second pivot coupling portion and a second connecting portion, wherein the first connecting portion and the second connecting portion are connected to form an axis, and the first hinge part and the second hinge part rotate with respect to the axis, and the axis is located between the first pivot coupling portion and the second pivot coupling portion;
   a first supporting part and a second supporting part coupled to two ends of the first pivot coupling portion and two ends of the second pivot coupling portion, respectively;
   an attractable element disposed on the second hinge part; and
   a magnet correspondingly located under the attractable element.

2. The key structure according to claim 1, wherein the magnet has an upper surface, and the attractable element has a lower surface facing the upper surface and forming an included angle with the upper surface when the attractable element has a line contact with the magnet.

3. The key structure according to claim 1, wherein the attractable element has a middle portion between the first end and the second end, the middle portion has a lower surface facing the upper surface in parallel and the lower surface of the middle portion separates a gap from the upper surface, the first end of the attractable element has a lower surface facing the upper surface and the lower surface of the first end contacts the upper surface at an acute angle, and the lower surface of the first end forms an obtuse angle with the lower surface of the middle portion.

4. The key structure according to claim 2, wherein the attractable element has an opening, and the opening overlaps the upper surface of the magnet in a vertical projecting direction of the key cap.

5. The key structure according to claim 4, wherein the attractable element further comprises a tongue plate extending into the opening and forming another included angle with the upper surface when the attractable element has the line contact with the magnet.

6. The key structure according to claim 1, wherein the first supporting part comprises two first pivot holes, the second supporting part comprises two second pivot holes, and the two first pivot holes are opposite to the two second pivot holes for receiving the two ends of the first pivot coupling portion and the two ends of the second pivot coupling portion, respectively.

7. The key structure according to claim 6, wherein the first supporting part further comprises a positioning hole located between the two first pivot holes, and the first hinge part has at least a positioning stick on the axis and received in the positioning hole, wherein when the key cap is pressed to move downwards, the positioning stick has a degree of freedom with respect to the positioning hole in a movement direction of the key cap.

8. The key structure according to claim 1, further comprising two first gaskets and two second gaskets, wherein the first gaskets are disposed on the two ends of the first pivot coupling portion respectively so that the first hinge part and the first supporting part and the first hinge part and the second supporting part are spaced apart at a first distance respectively, and the second gaskets are disposed on the two ends of the second pivot coupling portion respectively so that the second hinge part and the first supporting part and the second hinge part and the second supporting part are spaced apart at a second distance respectively.

9. The key structure according to claim 1, further comprising a thin film circuit board correspondingly located under the bridge assembly, wherein the first hinge part and the second hinge part further comprise a first protrusion and a second protrusion respectively for being in contact with the thin film circuit board, and wherein when the first hinge part and the second hinge part rotate with respect to each other, the first protrusion and the second protrusion reduce a tolerance between the first hinge part and the thin film circuit board and a tolerance between the second hinge part and the thin film circuit board respectively.

10. The key structure according to claim 1, further comprising a supporting board for connecting the first supporting part and the second supporting part, wherein the first and second supporting parts are in parallel and erected on the supporting board.

11. The key structure according to claim 10, further comprising a base board, wherein the base board stacks with the supporting board, and the base board has a recess for receiving the magnet, wherein a bottom of the magnet is in contact with the base board and the magnet is encompassed by sidewalls of the recess.

12. The key structure according to claim 9, wherein the thin film circuit board has a first switch element and a second switch element, the first hinge part has a first actuation portion correspondingly located above the first switch element, the second hinge part has a second actuation portion correspondingly located above the second switch element, and the first actuation portion and the second actuation portion are adjacent to edges of the key cap and on opposite sides with respect to the axis passing through the center of the key cap.

13. The key structure according to claim 12, wherein the first switch element are two, and the second switch element are two, and the positions of the first switch elements and the second switch elements are corresponding to four corners of the key cap.

14. A key structure, comprising:
a key cap;
a bridge assembly disposed under the key cap, wherein the bridge assembly comprises:
 a first hinge part, having a first pivot coupling portion and a first connecting portion; and
 a second hinge part, having a second pivot coupling portion and a second connecting portion, wherein the first connecting portion and the second connecting portion are connected to form an axis, the first hinge part and the second hinge part rotate with respect to the axis, and the axis is located between the first pivot coupling portion and the second pivot coupling portion;
a first supporting part and a second supporting part coupled to two ends of the first pivot coupling portion and two ends of the second pivot coupling portion, respectively;
an attractable element disposed on the second hinge part and rotatable with the second hinge part in a same rotating direction around the axis; and
a magnet correspondingly located under the attractable element.

15. A key structure, comprising:
a key cap;
a bridge assembly disposed under the key cap, wherein the bridge assembly comprises:
 a first hinge part, having a first pivot coupling portion and a first connecting portion; and
 a second hinge part, having a second pivot coupling portion and a second connecting portion, wherein the first connecting portion and the second connecting portion are connected to form an axis, the first hinge part and the second hinge part rotate with respect to the axis, and the axis is located between the first pivot coupling portion and the second pivot coupling portion;
a first supporting part and a second supporting part coupled to two ends of the first pivot coupling portion and two ends of the second pivot coupling portion, respectively;
an attractable element disposed on the second hinge part; and
a magnet correspondingly located under the attractable element, wherein when the key cap is not pressed, the attractable element contacts the magnet.

* * * * *